(12) United States Patent
Cordova

(10) Patent No.: US 7,001,947 B2
(45) Date of Patent: Feb. 21, 2006

(54) CYANOADHESIVE COMPOSITION FOR TOY ARTICLES

(75) Inventor: Abimael Cordova, Whittier, CA (US)

(73) Assignee: Mattel, Inc., El Segundo, CA (US)

( * ) Notice: Subject to any disclaimer, the term of this patent is extended or adjusted under 35 U.S.C. 154(b) by 76 days.

(21) Appl. No.: 10/693,086

(22) Filed: Oct. 24, 2003

(65) Prior Publication Data

US 2004/0087710 A1    May 6, 2004

Related U.S. Application Data

(62) Division of application No. 10/034,416, filed on Dec. 28, 2001, now Pat. No. 6,660,327.

(51) Int. Cl.
    *C08L 33/14*      (2006.01)
(52) U.S. Cl. .............. 524/555; 524/533; 525/244; 525/258; 427/207.1
(58) Field of Classification Search ............... 524/555, 524/533, 295, 575; 525/244, 258; 427/207.1
See application file for complete search history.

(56) References Cited

U.S. PATENT DOCUMENTS

| | | | | |
|---|---|---|---|---|
| 3,264,249 A | * | 8/1966 | Araki et al. ............ | 523/118 |
| 3,968,186 A | * | 7/1976 | Tomaschek et al. ...... | 524/112 |
| 4,016,327 A | * | 4/1977 | Fumei et al. ........... | 428/314 |
| 4,102,945 A | * | 7/1978 | Gleave .................. | 525/293 |
| 4,364,876 A | | 12/1982 | Kimura et al. ........ | 260/465.4 |
| 4,980,086 A | * | 12/1990 | Hiraiwa et al. ........ | 252/511 |
| 5,623,010 A | | 4/1997 | Groves ................. | 524/174 |
| 5,994,464 A | | 11/1999 | Ohsawa et al. ......... | 525/85 |
| 6,617,385 B1 | * | 9/2003 | Klauck et al. ......... | 524/314 |

FOREIGN PATENT DOCUMENTS

JP      01182385 A    *    7/1989

\* cited by examiner

*Primary Examiner*—David W. Wu
*Assistant Examiner*—Satya Sastri
(74) *Attorney, Agent, or Firm*—Robert W. Mulcahy

(57) ABSTRACT

The present invention provides a cyanoacrylate adhesive composition having high shear bond strength, peeling bond strength, tensile strength and impact bond strength and superior wear characteristics particularly in toy applications where hostile play environments demand hot-cold cycle resistance. The cyanoacrylate adhesive composition contains (a) up to 20% by weight of a cyanoacrylate monomer, (b) a styrene-based elastomeric block copolymer, and (c) a specific solvent which is selected to effect the solution of both components. The invention is also directed to a method of applying the instant adhesives to substrate surfaces.

6 Claims, No Drawings

CYANOADHESIVE COMPOSITION FOR TOY ARTICLES

This is a divisional of application Ser. No. 10/034,416, filed Dec. 28, 2001, now U.S. Pat. No. 6,660,327.

BACKGROUND OF THE INVENTION

1. Field of the Invention

The present invention relates to a novel adhesive composition and process for applying a styrenic based adhesive and cement coatings to thermoplastic polymer surfaces, particularly to toy articles formed of resin materials. Specifically, the present invention relates to a cyanoacrylate adhesive composition having superior bonding and hot-cold cycle resistance characteristics, particularly suited for unfriendly toy play environments.

2. Description of the Related Art

Children's toys and dolls, in particular, have a history dating back into antiquity. Generally, the technology surrounding the manufacture of dolls centers on creation of an attractive doll face, miniturized application of conventional clothes, manufacture of a doll body using plush or other sculptural techniques, and the simulation of the hair with sculptural elements, fibers, or other techniques. In the case of doll faces, the doll maker has a wide panoply of possible constructions and manufacturing techniques at his disposal. Traditional techniques involve the use of plaster-like or hard plastics material to cast a doll face. In time, however, soft rubber materials such as styrene-butadiene rubber (SBR) and styrene-butadiene-styrene block copolymer (Kraton) elastomers have come to replace plaster and hard plastics in the production of doll heads because of their realistic look and feel.

The soft rubber doll faces include all the normal features of a human figure simulated by the doll including the entire head, including well formed lips, teeth, cheeks, nose, chin, ears, and forehead. After the injection molding of an elastomeric doll face, it is finished by applying a dye or other similar material to give the face a natural skin color. Thereafter the soft rubbery doll's head must be joined to a body portion comprised of a torso and limbs to complete a full bodied toy doll item. This is generally accomplished by gluing, sealing or cementing the soft eleastomeric head potion to the headless body section generally composed of a hard or firm plastic. In selecting an adhesive for the purpose of affixing the dolls' head two considerations are important: (1) that the adhesive form a firm and effective bond and seal between the soft elastomer and the harder resin substrate surface and (2) that the adhesive composition be relatively quick drying so as to accommodate expeditious doll manufacturing processes. The principle outlined here can be applied to any toy parts requiring laminating or bonding affixation of parts. The present invention provides a cyanoacrylate adhesive which provides superior bonding and rapid curing or drying.

It is well known that alpha.-cyanoacrylate (also known as 2-cyanoacrylate) adhesives polymerize and cure rapidly in the presence of trace water absorbed on the surface of a material to be bonded, affording an extremely strong bond in a short time for almost all materials except some inert materials such as polyethylene and Teflon. Because of such a superior property, alpha-cyanoacrylate adhesives are widely used as instantaneous adhesives for a room temperature setting as one-part type adhesives for the bonding of metals, plastics, rubber, wood, etc. However, since the cyanoacrylate polymer is a brittle polymer, cyanoacrylate adhesives have the drawback that they are inferior in peeling bond strength and impact resistance. This problem has been generally remedied by modifying the cyanoacrylate adhesive compositions with various elastomers, core-shell polymers, adhesives and reinforcing agents. The present invention carries this modification concept one step further in employing styrene block co-polymers in adhesive applications for toy manufacturing.

As indicated above, the class of the styrenic elastomeric materials commonly used as the molding material for toy doll faces and the harder structural portions of toy articles are A-B-A type block polymers such as styrene-butadiene-butylene copolymer-styrene or styrene-butadiene-styrene, manufactured by Shell and sold under the trademark Kraton. In the case of a toy having a hard surface comprised of a rigid or semirigid A-B-A styrene based block copolymer, a compatible elastomeric A-B-A styrene copolymer in the form of styrene-ethylene-butylene-styrene, (SEBS, sold under the trademark Kraton-G) has been found to be an exceptional modifier of the alpha-cyanoacrylate adhesives to render them useful as glues, cements, or sealants to bond mechanical parts in in toy items.

For adhesives used to bond toy mechanical parts and like structures which are used in rugged or otherwise unfriendly environments it is considered necessary to have not only a high bond strength in the normal state of use but also a high adhesive force to endure the heavy handling of child's play. Moreover, the bonded mechanical parts must even be capable of withstanding extreme or sudden changes in temperature caused by leaving the toy item outdoors or immersing the toy item in hot and cold water, e.g. a child subjecting a doll to a sink bath. Conventional cyanoacrylate adhesive compositions are not generally satisfactory in meeting these demands as adhesives in toy items.

It has been found that a cyanoacrylate adhesive composition containing certain styrenic block copolymers and certain solvents results in an adhesive which not only possesses high shear adhesive force, peeling bond strength and impact adhesive force but also exhibits an outstanding hot-cold cycle resistance and heat resistance.

SUMMARY OF THE INVENTION

In accordance with the present invention, there is provided an improved cyanoacrylate adhesive composition particularly useful for toy article applications comprising (1) a styrenic elastomeric block copolymer, (2) a cyanoacrylate monomer, and (3) a solvent composition comprised of certain high evaporation rate organic solvents. More particularly, the cyanoacrylate adhesive composition is characterized by containing (a) up to 20% by weight of an alpha cyanoacrylate monomer, (b) a styrenic elastomeric block copolymer miscible or compatible with the cyanoacrylate monomer, and (c) an organic co-solvent mixture having solubility parameters compatible with the solubility parameter of the elastomeric phase of the block copolymer.

Specifically provided herein as a preferred embodiment is a cyanoacrylate adhesive comprises from about 2% up to 10% by weight of an alpha alkyl cyaloacrylate, a high molecular weight styrene-ethylene-butylene-styrene block copolymer, and an organic solvent having a solubility compatibility with both components. The solvents are certain organic liquids which (1) have relatively high evaporation rates, (2) are capable of solubilizing the cyanoacrylate, and (3) offer stability to the styrenic copolymer partner in the coating composition and in the elastomeric substrates to which they are applied in that the co-solvent is non-reactive with and non-destructive to the respective component materials.

High evaporation rate organic solvents and co-solvents within the purview of the present invention include isoprene, hexane, heptane, styrene liquid, xylene, toluene, methylcyclohexane, cyclohexane, 2,2-dichloropropane, methylene chloride, diisobutyl ketone, diisopropylketone, methyl isobutyl ketone, methyl isopropyl ketone, methyl cyclohexanone, cyclohexanone, isobutyl acetate, isopropyl acetate, butyl acetate, propyl acetate, ethyl acetate, diethyl ether, dimethyl ether, diethylene glycol, 2-ethylhexanol, and mixtures thereof. Any one or more of these solvents that is capable of solubilizing both the styrene phase and the elastomeric rubber portions of the styrenic block copolymer of the present cyanoacrylate adhesive composition will function effectively in the instant invention. In the case of the high molecular weight styrenic block SEBS, the solubility parameter (to be explained below) is about 7.9 from which it can be calculated that a solvent combination or blend having a solubility parameter of between 7.4 to 9.4 will be effective within the purview of the instant invention. The high evaporation rates of the instant solvents causes enhancement of evaporation of any water adsorbed on the surface of the resin substrate surface to which the present adhesive to be applied with the result that the water is completely driven off in an adhesive coating drying step.

The present invention utilizes styrene block copolymers sold generally under the trademark Kraton by the Shell Chemical Company. Kraton polymers can be dissolved in many single solvents, such as toluene, and in many solvent blends, such as hexane/MEK. In contrast to the usual plastics and rubbers which have only a single phase, a Kraton polymer has two phases. In order to form a true solution, the solvent system must be capable of dissolving both of these phases. If blends of solvents are used, and even wider variety of solvent systems may be considered. A polymer will generally dissolve in those solvents with Solubility Parameters close to that of the polymer itself. Since Kraton polymers have two different polymers in each molecule, a good solvent must have a Solubility Parameter for both.

The Solubility Parameter is the Hilderbrand solubility parameter which is a measure of the total forces holding the molecules of a solid or liquid together. This measurement and its application to Kraton type copolymers (styrenic elastomeric block copolymers) is explained in the publication "Solution Processing of Kraton Polymer Coatings" published by the Shell Chemical Company (Dec. 30, 1998) and hereby incorporated by reference in its entirety.

The styrenic copolymer/co-solvent adhesive compositions made in accordance with the present invention dry in a rapid manner to enable a strong bond of the copolymer with polymeric substrate surfaces thereby engendering firm bonding of an applied surface with a substrate surface; that is, a sandwiched film of adhesive between an applied blanket cover to a substrate will afford an extremely strong bond between the two surfaces.

The discovery of the present invention is that one may formulate a superior adhesive, cement, or glue composition by combining a cyanoacrylate, a styrenic elastomeric copolymer and a solvent in certain amounts to form an adhesive composition of exceptional character when applied to elastomeric substrate surfaces. While the adhesive composition can be applied to any thermoplastic resin surface, the instant compositions are especially effective as an adhesive for substrates comprised of styrene based elastomers, those copolymers with a linear A-B-A configuration in which A is a polystyrene endblock. It is believed that the solvent selection or mixture of same herein is particularly effective in solubilizing the copolymer and cyanoacrylate and the styrene-based copolymer molecules of the substrate surface thereby takifying the elastomeric surface to generate a miscible interface with the applied film of adhesive, resulting in a very strong amalgam like bonding of the adhesive film to the substrate upon drying. When the adhesive is used to laminate two substrate surfaces an amagam of the two surfaces occurs resulting in a strong high peel strength bonding between the two surfaces. The adhesive compositions herein have particular advantage and application to children's toys because of the pervasive use of styrenic block soft and hard elastomeric material substrates in toy manufacturing and are particularly useful in applications to the soft elastomeric materials used in doll facial structures where the adhesion of these rubber facial structures to a hard resin torso and limb structure is expected to withstand the rigorous and hostile environment of child use.

In a further embodiment, the present invention is even more particularly directed to a cyanoacrylate adhesive coating composition for elastomeric substrates comprising from about (1) 1.0% to 20% by weight of an alkyl cyanoacrylate, (2) styrenic elastomeric copolymer resin selected from the group comprising styrene butadiene rubber (SBR), styrene-butadiene-styrene (S-B-S), and styrene-ethylene-butylene styrene (SEBS) elastomeric block copolymers, and (3) an organic solvent having a specific Solubility Parameter of from about 7.4 to about 9.4. An even more preferred adhesive composition comprises (1) from about 2.0% to 10% of an alkyl cyanoacrylate selected from group comprising methyl, ethyl, or propyl cyanoacrylate, (2) a styrene-ethylene-butylene styrene (SEBS) elastomeric block copolymer and (3) an organic solvent selected from the group consisting of toluene, xylene, heptane, t-butyl acetate and mixtures thereof. As already indicated, this coating composition has been found especially effective in application to styrenic surface subtrates and, particularly, the group comprising styrene butadiene rubber (SBR), styrene butadiene styrene, and styrene-ethylene-butylene-styrene elastomeric copolymer surfaces.

DETAILED DESCRIPTION OF THE INVENTION

The cyanoacrylate monomer as the first ingredient of the cyanoacrylate adhesive composition according to the present invention is a compound known well as an alpha-cyanoacrylate and represented by the following general formula:

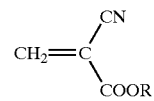

where R is an ester residue such as alkyl, cycloalkyl, alkenyl, cycloalkenyl, alkynyl, phenyl, or aryl. The number of carbon atom of the ester residue is not specially limited, but there usually is employed a hydrocarbon group having 1 to 8 carbon atoms. A substituted hydrocarbon group such as alkoxyalkyl or trialkylsilylalkyl is also employable as the ester residue.

As examples of the cyanoacrylate monomer are mentioned alkyl and cycloalkyl alpha-cyanoacrylates such as methyl alpha-cyanoacrylate, ethyl alpha-cyanoacrylate, propyl alpha-cyanoacrylate, butyl alpha-cyanoacrylate, and cyclohexyl alpha-cyanoacrylate, alkenyl and cycloalkenyl alpha-cyanoacrylates such as allyl alpha-cyanoacrylate, methallyl alpha-cyanoacrylate, and cyclohexenyl alpha-cyanoacrylate, alkynyl alpha-cyanoacrylates such as propargyl alpha-cyanoacrylate, aryl alpha-cyanoacrylates such as phenyl alpha-cyanoacrylate and toluyl alpha-cyanoacrylate, hetero atom-containing methoxyethyl alpha-cyanoacrylate, ethoxyethyl alpha-cyanoacrylate, furfuryl alpha-cyanoacrylate, silicon atom-containing trimethylsilylmethyl alpha-cyanoacrylate, trimethylsilylethyl alpha-cyanoacrylate, trimethylsilylpropyl alpha-cyanoacrylate and dimethylvinylsilylmethyl alpha-cyanoacrylate.

While any and all the alpha cyanoacrylates operate within the purview of the present invention, the preferred cyanoacrylates are alkyl alpha cyanoacrylates having alkyl groups of from 1–8 carbon atoms and most preferred alkyl alpha cyanoacrylates are selected from the group comprising methyl, ethyl, propyl, and butyl alpha cyanoacrylate (also known as methyl 2-cyanoacrylate, ethyl 2-cyanoacrylate etc.)

The second ingredient of the 2-cyanoacrylate adhesive compositions according to the present invention is an elastomer which is miscible or compatible with the cyanoacrylate monomer. The terms "miscible" or "miscibility" and "compatible" or "compatibility" are commonly used in the polymer alloy field. The former represents a state wherein the elastomer and the cyanoacrylate monomer are mixed microscopically, namely, on a molecular level, while the latter represents a state wherein the elastomer is dispersed macroscopically in the cyanoacrylate monomer in a stable manner [see, for example, "Polymer Alloy--Basis and Application", edited by Kobunshi Gakkai, published by Tokyo Kagaku Dojinsha, (2nd Edition, Apr. 16, 1993)].

The present adhesive composition is the combination of three key ingredients: the 1-cyanoacrylate, the elastomeric styrene block copolymer, and the solvent comprised of a a high evaporation rate organic solvent or co-solvent having specific solubility parameters tailored to the solubility of the elastomeric copolymer, which combination of characteristics provides for the desirable properties of the instant invention recited above. The advantages of the instant composition are generated by the use of particular organic polymer solvents in combination to enhance the application of alphacyanoacrylate/polymer/organic solvent based coating compositions. In particular, the organic solvent or co-solvent used in the present adhesive composition must possess (1) a high evaporation rate, (2) polymer solubilization charateristics, i.e. it must be capable of dissolving styrene based polymers and copolymers, and (3) styrene based stability, i.e. the solvent must be non-reactive with styrene based polymers so as to not chemically degrade them in solution or on a substrate containing styrene based polymers upon which the coating is to be applied. Solvents possessing these characteristics include isoprene, hexane, heptane, styrene liquid, xylene, toluene, methylcyclohexane, cyclohexane, 2,2-dichloropropane, methylene chloride, diisobutyl ketone, diisopropylketone, methyl isobutyl ketone, methyl isopropyl ketone, methyl cyclohexanone, cyclohexanone, isobutyl acetate, isopropyl acetate, butyl acetate, propyl acetate, ethyl acetate, diethyl ether, dimethyl ether, diethylene glycol, 2-ethylhexanol and mixtures thereof. Other solvents within the purview of the present invention include terpenes such as limonene, d-limonene, l-limonene, all taught in common assignee owned U.S. patent application Ser. No. 09/921,116 filed on Aug. 2, 2001, which solvents may be used in combination with the high evaporation rate solvents but not preferably because the terpenes have inherently lower evaporation rates.

As indicated above, a preferred elastomeric styrenic block copolymer in the instant invention is high molecular weight styrene-ethylene-butylene-styrene (SEBS sold commercially as Kraton G by The Shell Chemical Company). It has been found that Solubility Parameters of from 7.4 to 9.4 are required for solubilization of both the elastomeric mid-block and styrenic portions of SEBS. Accordingly, solvents having this solubility characteristic for the 1-cyanoacrylate and SEBS in the most preferred embodiments of the present adhesive composition comprise t-butyl acetate, cyclohexanone, heptane, toluene, xylene and mixtures thereof. Optimum solvents are solvent blends of heptane/t-butyl acetate, toluene/cyclohexanone, and xylene/t-butyl acetate. These preferred solvents have very high evaporation rates and maximum compatibility with the high molecular weight SEBS copolymer and the 1-cyanoacrylate in the instant adhesive composition.

The styrene based resinous component of the present adhesive composition includes blends prepared by the copolymerization of one or more conjugated dienes, such as butadiene, isoprene, and chloroprene with styrene. Useful blends in the preparation of the instant adhesive compositions include styrene butadiene rubber (SBR) and styrene-butadiene-styrene block copolymer. Styrene-based thermoplastic elastomers comprise blocks of hard segments, e.g., polystyrene, and blocks of soft segments, e.g., polyisoprene, polybutadiene, poly(ethylene-propylene), poly(ethylene-butylene), and polypropylene. Thus, useful styrene-based elastomers may comprise, for example, blocks of polystyrene and blocks of polyisoprene, or blocks of polystyrene and blocks of polybutadiene, or blocks of polystyrene and blocks of poly(ethylene-butylene). Examples of the most preferred styrene based thermoelastic elastomers useful in the present adhesive composition, include high molecular weight styrene-ethylene-butylene-styrene (SEBS) block coplymers (e.g. KRATON G-1650, G-1651, G-1652, and G-1657). Other styrenic copolymers operable within the purview of the instant invention include styrene-ethylene-propylene-styrene block copolymers (e.g. KRATON G-1701, G-1702 and G-1762X), all commercially available from Shell Chemical Company as well as combinations of these block copolymers with SEBS can also be included. Other styrenic block copolymers include styrene-isoprene-styrene (S-I-S), natural butyl rubber (NBR), and styrene-ethylene-styrene (S-E-S). Styrene-ethylene-butylene-styrene (SEBS) copolymers are particularly effective because they have superior physical properties manifested in the cyanoacrylate adhesives of the present invention, including durability in that the instant adhesives can withstand prolonged wear and tear in the form of impact resistance and flexibility. Since the cyanoacrylate is present in a minimum of up to 20% by weight, the amount of thermoplastic block copolymer elastomer useful in the present adhesive compositions is not critical in achieving the desired characteristics; that is, the block copolymer can be present in any amounts of between 80 to 99 wt %.

The compositional weights recited herein are based on the resin/1-cyanoacrylate composition and inclusion of any additives will accordingly affect the overall compositional weight but the ratio of styrenic resin to the alpha cyanoacrylate will remain the same as initially formulated; that is, a 5% by weight cyanoacrylate in 95 wt % of a styrenic copolymer blend will remain in the same ratio to one another even with the addition of dye or pigment.

It is to be emphasized that the purview of the compositional invention herein is the combination of a styrene based thermoplastic polymer and a 1-cyanoacrylate mixture in certain amounts for adhesion application to elastomeric substrate surfaces. As indicated above, especially effective elastomers are styrene-ethylene-butylene-styrene (SEBS) copolymers which are solvated very effectively with the solvents recited, the compatibility between the polymer and the solvents being speculated as being due to the mutual unsaturation in the solvents and the ethylene-butylene segment of the styrenic polymer. The particular compatibility of the solvent and the SEBS polymer in the coating composition follows on through application to a solid molded or otherwise formed SEBS or other styrenic block copolymer substrate surface, which acts as an optimal substrate surface for application of the SEBS/cyanoacrylate/solvent adhesive composition. Accordingly, the most preferred embodiment of this invention is an application of an SEBS/alpha cyanoacrylate/solvent mixture adhesive coating to a solid molded SEBS substrate surface.

It is apparent that the adhesive coating solution may contain the same styrenic co-polymer as that material co-polymer in the substrate to be coated. In fact the solubilizing effects of the instant specialized solvents on the styrenic copolymer in the instant adhesive coating composition encourages application of the coating to a similar or identical co-polymer substrate surface so that compatible adhesion takes place between the solubilized co-polymer in the adhesive coating solution and that similar or identical co-polymer material in the substrate to which the coating is to be applied. An application of the subject adhesive coating include the steps of (i) providing an elastomeric resin substrate; (ii) applying a composition comprising from about 1.0% to 20.0% by weight of a cyanoacrylate, from 80% to 99.0% by weight of a styrenic block copolymer resin in a solvent mixture to the elastomeric substrate; and (iii) curing the applied composition to form a layer of adhesive on the elastomeric substrate.

The coatings and adhesive compositions herein are characterized by viscosities approaching that of ordinary viscous glue formulations. A dried coat of the instant formulations have elongation values and adhesion characteristics conforming to the quality and safety standards necessary for application to toy products. In addition, these adhesives have ultimate tensile values of greater than about 500 psi indicating that toughness is not being sacrificed to flexibility in the use of these coating compositions. It is important that coatings or adhesives used for application to toy articles, such as a soft elastomeric doll facial element, have high tensile strength so that the coated or painted article have child use durability especially as to stretchability. The instant adhesive compositions have flexibility at both ambient and cold temperatures.

The instant coating may contain a pigment, dye, or colorant in amounts of up to 3% by weight in addition to the thermoplastic elastomeric resin, the cyanoacrylate, and organic solvent. The pigment used herein is not particularly limited and various inorganic or organic pigments can be employed. Concrete examples of pigments and colorants are: synthetic organic colorants sold as the T-series by the Day Glow Corporation of South Gate City, Calif. Other pigments which can be used include sodium aluminum sulpho silicate sold as MR 582 by the Cleveland Pigment Corp. of Cleveland, Ohio; polyamide condensates with organic dyes with less than 2% phthalocyanine; and tetrachloro-zincate sold by the Day Glow Corporation.

In addition to the additives mentioned above, compositions made in accordance with the present invention may additionally employ small amounts of agents such as ethylene glycol and clay mixtures to provide the desired texture and body for ease of application of the instant adhesive coating compositions. In certain adhesive applications, fillers and stabilizers such as organic and inorganic fibers, sand, talc and mixtures thereof may also be included as part of the coating composition. Compositions of the present invention can be applied by any means such as with a spatula, brush, a cloth, or a spray applicator. The surface of a polymeric substrate surface should be clean and dry before application of the instant adhesive coating. Once applied the compositions should be allowed a sufficient period to allow curing of the composition by drying of the solvent.

Having generally described the present invention, the following examples are set for the below to further demonstrate compositions embodying the present invention. The compositions of the present invention are prepared by adding a specified amount of cyanoacrylate to styrenic block copolymer resins in a particular solvent mixture under agitaiton. Specified amounts of other ingredients are added where indicated. In the following Example 1, the applied composition is subjected to a Surface Coating Adhesion (Tape Pull) Test, and a Shear and Stretch Tests to determine the adhesion and stretch characteristics of the present cyanoacrylate/styrenic elastomeric block copolymer/organic solvent adhesive coating composition. These tests are carried out employing standard Quality and Safety Operating Procedures of the Assignee of the present application, Mattel, Inc.

The shear strength test is a measure of the cohesiveness or internal strength of an adhesive. It is based upon the amount of force required to pull an adhesive strip from a standard flat surface in a direction parallel to the surface to which it has been affixed with a definite pressure. It is measured in terms of time (in minutes) required to pull a standard area of adhesive coated sheet material for a stainless steel test panel under stress or a constant, standard load.

EXAMPLE 1

4 percent by weight of 1-methyl cyanoacrylate is added to 96 percent by weight of a high molecular weight styrene-ethylene-butylene-styrene (SEBS) copolymer elastomer known as Kraton 1650 and dissolved in 200 mls of a t-butyl acetate/heptane/cyclohexanone cosolvent mixture (in a 20/30/50 volume ratio) in a flask. After complete disolution of measured quantities of the styrenic elastomer and cyanoacrylate, a viscous solution is achieved significantly greater than water. A molded soft elastomeric rubbery doll face comprised of a solid molded SEBS elastomeric copolymer is provided and the cyanoacrylate adhesive composition applied to the back surface of the molded doll face for intended adhesion and affixation to a doll torso body structure comprised of a hard elastomeric styrenic copolymer surface. The rubbery doll facial item was fitted to the torso by applying the adhesive coated back surface to and affixing the face to the doll body. The constructed item was allowed to dry for 3 minutes. Thereafter the rubbery doll face and body structure were subjected to 1600% Elongation Test, a Shear Test, and a Peel Test to stress the adhesive laminate. The tests revealed that the adhesive laminate did not split, peel, or abrade under the tests, the doll's head remaining firmly on the torso body. The surface bonding between the adhesive coating on the backside of the doll's face and the surface substrate of the torso was so strong and uniform so as cause complete adhesion between the styrenic coating and the elastomeric substrate surface of the doll body.

EXAMPLE 2

100 grams of the same styrenic thermoplastic elastomer of Example 1 (Kraton 1650) and 10 grams of 2-ethylcyanoacrylate were dissolved in a 100 mls volume of a heptane/xylene/toluene solvent mixture in a wide mouth beaker. After complete disolution of the styrenic thermoplastic elastomer with difficult stirring, the viscosity of the solution was approximate that of a thick glue. Thereafter a hard thermoplastic styrenic copolymer substrate surface is provided and a dab of the viscous glue is applied to the hard surface and as separate piece of rubbery material, comprised of Kraton G material, is patched onto the dabbed viscous area. After drying for an hour the patched rubber item was found glued tenaciously to the hard thermoplastic elastomeric substrate surface without any damage to the surface. Attempts at removal of the patch results in damage to the hard elastomeric substrate surface because of the tearing action.

The adhesive compositions of the present invention possess unique combinations of properties, including both a high degree of elastic durability under suddenly applied stresses, and a high degree of plasticity when the stress is applied more slowly. The miscible character of the styrenic polymer/cyanoacrylate/solvent composition when applied to a molded polystyrene endblocked polymer substrate surfaces causes an anneal like bonding with that substrate surface so as to form a physically indistinguishable layer with that surface. Accordingly the well bonded compositional layer reacts to the physical stresses applied to the body of the substrate in exactly the same maimer as the underlying substrate. Therefore the bond created by the adhesives herein will stretch, strain, and impact as its substrate underlayer and shoe no splitting or peeling. Other properties include excellent stability throughout a very wide temperature range.

Having thus described the principals of the invention, together with illustrative embodiments thereof, it is to be understood that although specific terms are employed, they are used in a generic and descriptive sense and not for the purpose of limitation, the scope of the invention being set forth in the following claims.

What is claimed:

1. A cyanoacrylate adhesive composition for thermoplastic substrate surfaces comprising a styrenic copolymer resin, an alpha cyanoacrylate in an amount of from about 2 to 10 weight % of the weight of the styrenic copolymer resin, and a high evaporation rate co-solvent mixture, said co-solvent mixture being capable of solubilizing, but non-reactive to, the styrenic copolymer resin and the thermoplastic substrate surface.

2. The adhesive composition of claim 1 wherein the high evaporation rate organic co-solvent is selected from the group consisting essentially of isoprene, hexane, heptane, styrene liquid, xylene, toluene, methylcyclohexane, cyclohexane, 2,2-dichloropropane, methylene chloride, diisobutyl ketone, diisopropylketone, methyl isobutyl ketone, methyl isopropyl ketone, methyl cyclohexanone, cyclohexanone, isobutyl acetate, isopropyl acetate, butyl acetate, propyl acetate, ethyl acetate, diethyl ether, dimethyl ether, diethylene glycol, 2-ethylhexanol and mixtures thereof.

3. The adhesive composition of claim 2 wherein the high evaporation rate solvent is selected from the group consisting essentially of t-butyl acetate, cyclohexanone, heptane, toluene, xylene and mixtures thereof.

4. The adhesive composition of claim 3 wherein the solvent has a Solubility Parameter of from 7.4 to 9.4.

5. The adhesive composition of claim 1 wherein the cyanoacrylate is 1-alkyl cyanoacrylate and the alkyl group contains from 1 to 8 carbon atoms.

6. The coating composition of claim 1 wherein the styrenic copolymer resin is selected from the group consisting essentially of styrene butadiene rubber (SBR), styrene butadiene styrene (SBS), styrene-isoprene-styrene (S-I-S), natural butyl rubber (NBR), styrene-ethylene-propylene-styrene (SEPS), styrene-ethylene-styrene (SES), and styrene-ethylene-butylene-styrene (SEBS) copolymer.

* * * * *